July 1, 1958 — S. C. HOARE — 2,841,767
ELECTRICAL MEASURING INSTRUMENT
Filed Dec. 28, 1955
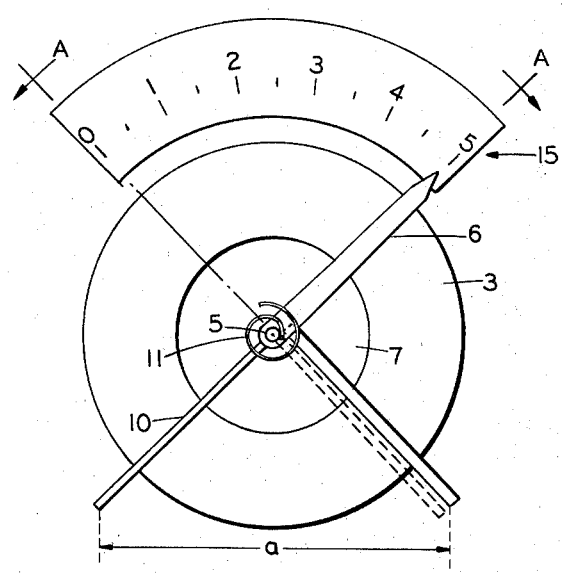
Fig. 1
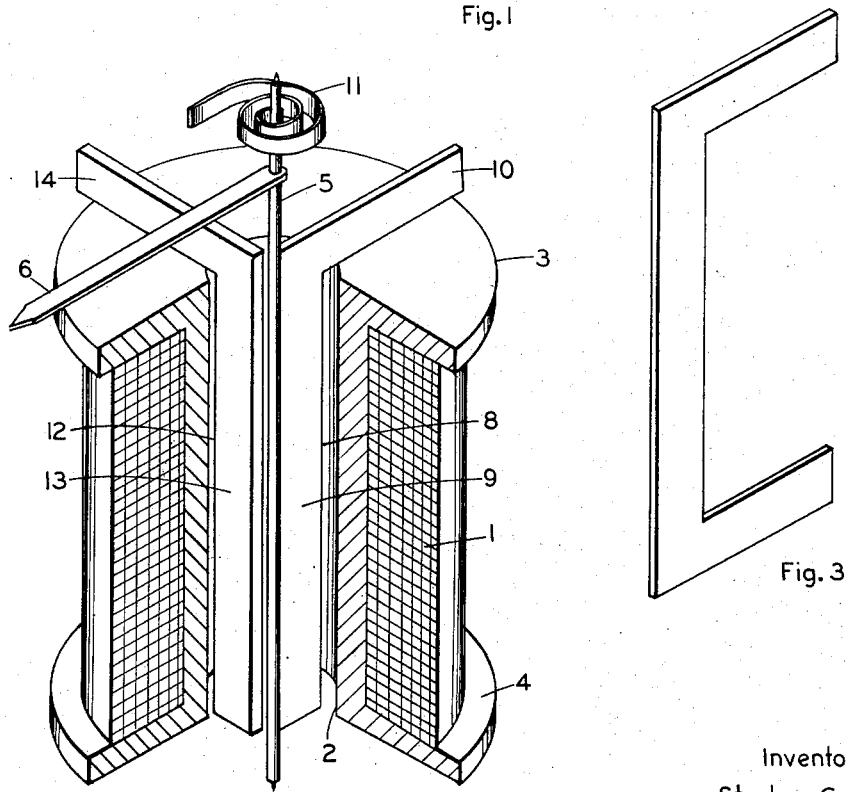
Fig. 2
Fig. 3
Inventor:
Stephen C. Hoare
by, Richard E. Horley
His Attorney United States Patent Office 2,841,767
Patented July 1, 1958

2,841,767
ELECTRICAL MEASURING INSTRUMENT

Stephen C. Hoare, Manchester, Mass., assignor to General Electric Company, a corporation of New York Application December 28, 1955, Serial No. 555,971

5 Claims. (Cl. 324—147)

This invention relates to electrical measuring instruments and concerns particularly current responsive repulsion instruments.

In electrical repulsion instruments an electrically energized field coil generates magnetic lines of flux which traverse a fixed and a movably mounted magnetizable repulsion vane, generally mounted within the aperture of such a coil. These flux lines induce magnetic fields of like polarity in both vanes and the resulting repulsion force causes the movably mounted vane, and a scale pointer coupled thereto, to move in respect to the fixed vane by an amount proportional to the magnitude of the coil current supplied from an external energizing means. For proper operation of such an instrument, the field coil must be large enough to establish a sufficient magnetic field and the instrument vanes must be of a sufficient area to exert a sufficient magnetizing repulsion force.

Thus, it is seen that proper instrument performance depends upon the size of the vanes and their associated field coil, and since the overall size of the instrument is a function of the dimensions of the vanes and coil, it is seen further that such dimensions may impose undesirable limitations on the minimum size of such instruments.

Therefore, it is an object of my invention to provide an improved repulsion instrument structure resulting in a substantial reduction of instrument size, and in particular a reduction of instrument outside diameter.

It is a further object of my invention to provide an improved and novel instrument vane structure which permits a substantially smaller instrument coil and thus an increase in ampere turns, i. e. instrument power, for a given length of wire.

In carrying out my invention in its preferred form, I provide a current responsive repulsion instrument utilizing fixed and movable current repulsion members, hereafter referred to as vanes, portions of which are mounted within the axial aperture of the field coil, i. e. current conducting coil, and other portions of which are mounted outside of said aperture extending beyond one or both end faces of the coil. The movable vane rotates about an axis extending through the axial aperture of the current conducting coil, and the portions of the fixed and the movable vanes within said axial aperture extend approximately radially off said axis. The portions of the fixed and movable vanes outside of said aperture also extend radially off said axis and exert the prime magnetic repulsion force when the coil is electrically energized.

The above objects, as well as the advantages and other objects of the invention, will be apparent from the following description when considered in connection with the accompanying drawing, in which:

Figure 1 is a diagrammatic front view of the invention.

Figure 2 is a diagrammatic perspective view of the instrument in section A—A of Figure 1.

Figure 3 is a front view of an alternative instrument vane structure.

In Figures 1 and 2, the principles of the invention are illustrated by diagrams in which the relative position of parts are shown, but in which unimportant parts not directly involved in the invention are omitted. The instrument structure includes a current conducting coil 1, wound on a spool-shaped winding form, of a suitable insulating material, consisting of hollow cylinder 2 and flanges 3 and 4. A shaft 5, carrying a scale pointer 6, is pivotally supported within the cylinder 2, having its axis substantially parallel and, if desired, coincidental with the longitudinal axis of the coil aperture 7. Pointer 6 cooperates with a suitable scale 15.

The instrument structure also includes a movable vane 8 and a fixed vane 12, both composed of ferromagnetic material. The term "ferromagnetic" as used herein refers to any material which is capable of being highly magnetized when in a magnetic field. Soft iron, alloys of nickel, iron and cobalt and other materials having high magnetic permeability and low retentivity may be satisfactorily employed.

In order to provide an adequate repulsion force between the vanes and still permit use of a coil of relatively small diameter, the fixed and movable vanes each have a portion extending radially outside of the coil at least at one end thereof.

In one embodiment a movable vane 8, substantially L-shaped, includes portions 9 and 10, with portion 9 extending longitudinally through aperture 7 and portion 10 extending substantially perpendicularly thereto outside of the aperture and adjacent to face plate 3. Vane 8 is rigidly attached to shaft 5, along the outside edge of vane portion 9, and is normally biased in a down scale direction by shaft biasing spring 11.

Fixed vane 12, also substantially L-shaped, includes portions 13 and 14, with portion 13 extending longitudinally through aperture 7 and portion 14, outside of the aperture and adjacent to face plate 3, extending substantially perpendicular to portion 13. The fixed vane 12 is rigidly attached, along the inside edge of portion 13, to cylinder 2.

Vanes 8 and 12 are thus constructed so that the prime vane repulsion force occurs between the radially extending portions 10 and 14 which are supplied with magnetic flux by portions 9 and 13. This permits a reduction of the radial height of vane portions 9 and 13 in order to reduce the inside diameter of coil 1. Such a reduction of inside coil diameter is desirable since it also allows a reduction of total coil wire length for a given magnitude of ampere turns. Some repulsion force, additive to that of vane portions 10 and 14, will occur between vane portions 9 and 13, but their primary function is to supply magnetic flux to the radial extensions 10 and 14 where the repulsion forces will be exerted at a relatively great radius from shaft 5.

In one specific embodiment of the invention, portions 10 and 14 were constructed to have a radial height of approximately half of the total axial length of the vanes, and more than four times the radial height of vane portions 9 and 13 respectively. The axial length of coil 1 and the longitudinal length of vane portions 9 and 13 were made somewhat longer than the straight line distance (a) between the vane ends at full scale deflection; see Figure 1. Although desirable scale distribution characteristics were obtained with this design, additional means known in the art may be employed to obtain a particular type of scale configuration.

In operation of the instrument, coil 1, which is adapted to be connected to the external electrical source to be measured, is energized by said source and generates a magnetic flux field. The flux induces magnetic fields of a like polarity in both vanes 8 and 12 and the resultant repulsion, primarily occurring between the radially extending vane portions 10 and 14, causes an upscale rotation of moving vane 8, overcoming the spring bias in an amount proportional to the magnitude of the current from the coil energizing means. It is understood that the vane repulsion and thus the vane movement is primarily due to the repulsion exerted by vane portions 10 and 14. This allows a decrease in the radial height of vane portions 9 and 13 and thus also permits a reduction in coil 1 diameter.

It is, of course, possible to employ vane structures of other configurations. For example, it may be advisable to employ C-shaped vanes of a general structure as shown in Figure 3 having radially extending arms beyond both ends of the energizing coil. In constructing instruments utilizing such a vane structure, it may be necessary to attach the second vane arm, or to bend it to shape, after the axial vane portion has been inserted into the coil armature.

Although certain embodiments of the invention have been particularly described, it will be obvious to those skilled in the art that many modifications and variations are possible. It is intended, therefore, to cover such modifications and variations as fall within the scope of my invention as defined in the appended claims.

What I claim as new and desire to secure by Letters Patent of the United States is:

1. In an electric measuring instrument of the repulsion vane type, the combination of: an electric coil having an axial aperture, said coil adapted to be energized by an electrical source, a fixed ferromagnetic repulsion vane, a movable ferromagnetic repulsion vane, rotatably mounted for magnetically deflecting from said fixed vane upon coil energization, said vanes having portions within the axial aperture of said coil and additional portions beyond said aperture, said additional portions exerting a mutual magnetic repulsion force upon energization of said coil, said additional portions having a radial length which extends beyond the maximum radial length of said aperture.

2. In an electric measuring instrument of the repulsion vane type, the combination of an electric coil having an axial aperture, said coil adapted to be energized by an electrical source, a fixed ferromagnetic repulsion vane, a movable ferromagnetic repulsion vane rotatably mounted for magnetically deflecting from said fixed vane upon coil energization, said vanes having radial portions within the axial aperture of said coil and having additional radial portions beyond said axial aperture, said additional radial portions exerting a mutual magnetic repulsion force upon energization of said coil, said additional radial portions having a radial length which exceeds the radial length of said aperture.

3. In an electric measuring instrument of the repulsion vane type, the combination of an electric coil having an axial aperture, said coil adapted to be energized by an electrical source, a first rotatably mounted ferromagnetic repulsion vane, a second ferromagnetic repulsion vane rigidly mounted in respect to said coil structure, each of said vanes having a first portion within the axial aperture of said coil of a first radial length and a second portion extending beyond said aperture of a second radial length greater than that of the first radial length and greater than the radial length of said aperture, said second portions exerting a mutual magnetic repulsion force upon energization of said coil to rotate said first vane.

4. In an electric measuring instrument of the repulsion vane type, the combination of an electric coil having an axial aperture, said coil adapted to be energized by an electrical source, a first fixed ferromagnetic repulsion vane and a second movable ferromagnetic repulsion vane mounted for rotation, said second vane moving with respect to said first vane when said coil is energized, each of said vanes being substantially L-shaped and having one portion within said axial aperture and a second substantially perpendicular portion outside of said axial aperture whereby upon energization of said coil a repulsion force is exerted between said second portions resulting in rotation of said second vane.

5. In an electric measuring instrument of the repulsion vane type, the combination of an electric coil having an axial aperture, said coil adapted to be energized by an electrical source, a first fixed ferromagnetic repulsion vane, and a second movable ferromagnetic repulsion vane mounted for rotation, said second vane moving with respect to said first vane when said coil is energized, each of said vanes being substantially C-shaped and having a center portion passing through said axial aperture and having two end portions substantially perpendicular to said center portion at opposite ends outside of said axial aperture whereby upon energization of said coil a repulsion force is exerted between said end portions resulting in rotation of said second vane.

References Cited in the file of this patent

UNITED STATES PATENTS 1,714,065    Weston _____ May 21, 1929